Feb. 10, 1959   G. J. NIEUWENHUIS ET AL   2,872,973
SPRAY DRYING APPARATUS FOR LIQUID MATERIAL
Filed Sept. 19, 1955   2 Sheets-Sheet 1
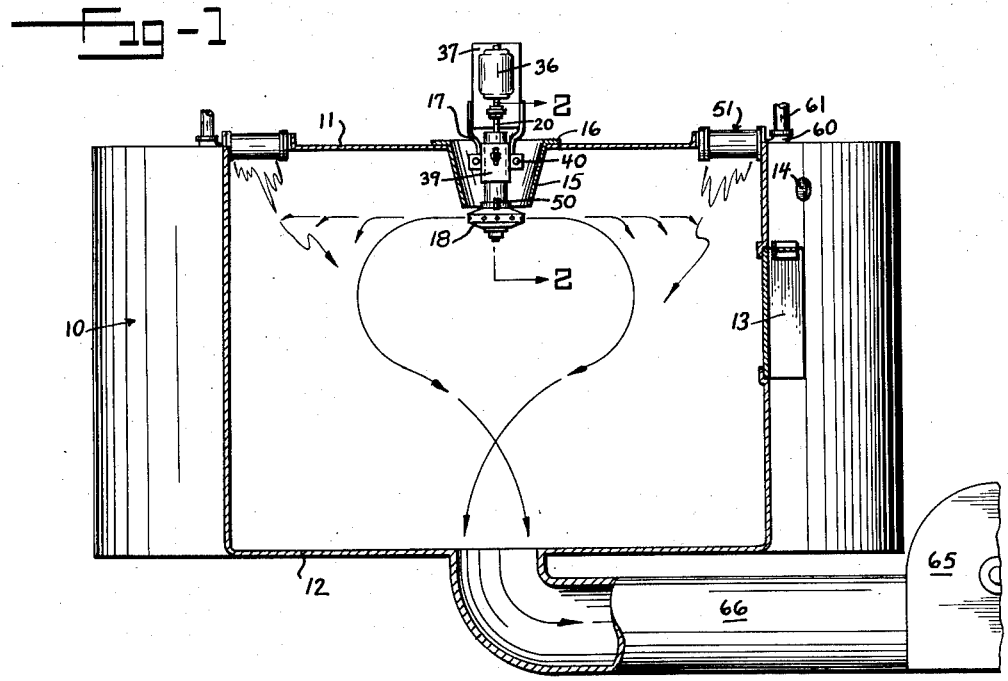
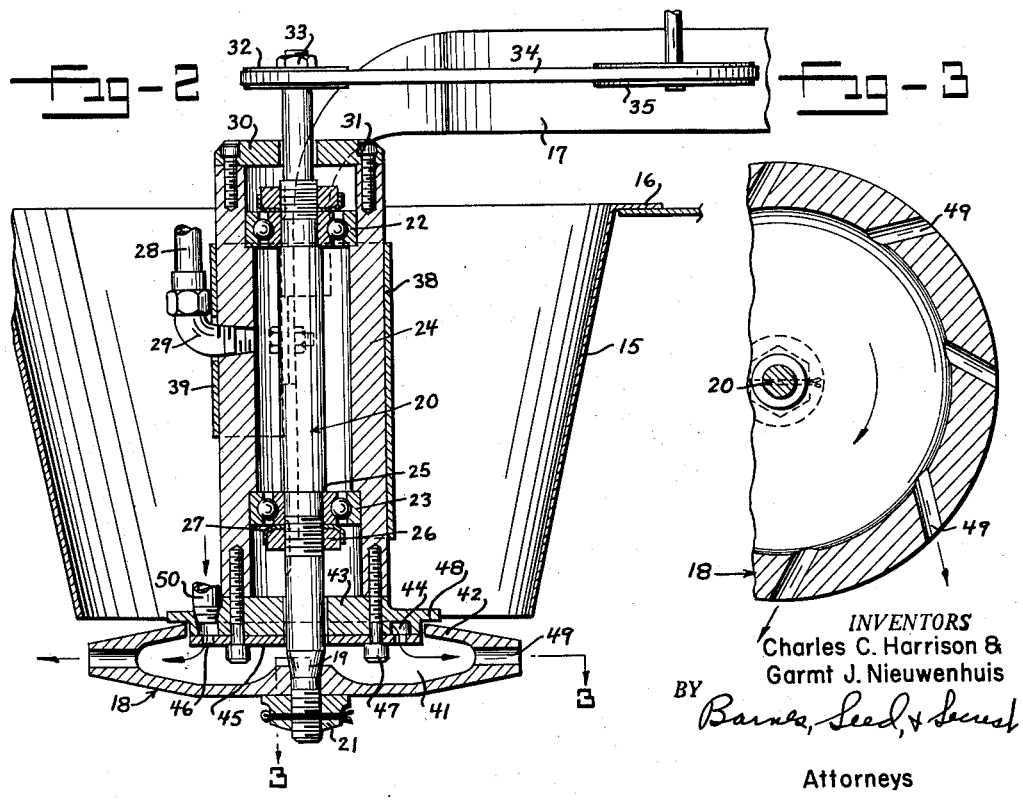
INVENTORS
Charles C. Harrison &
Garmt J. Nieuwenhuis
BY Barnes, Seed, & Secrest
Attorneys

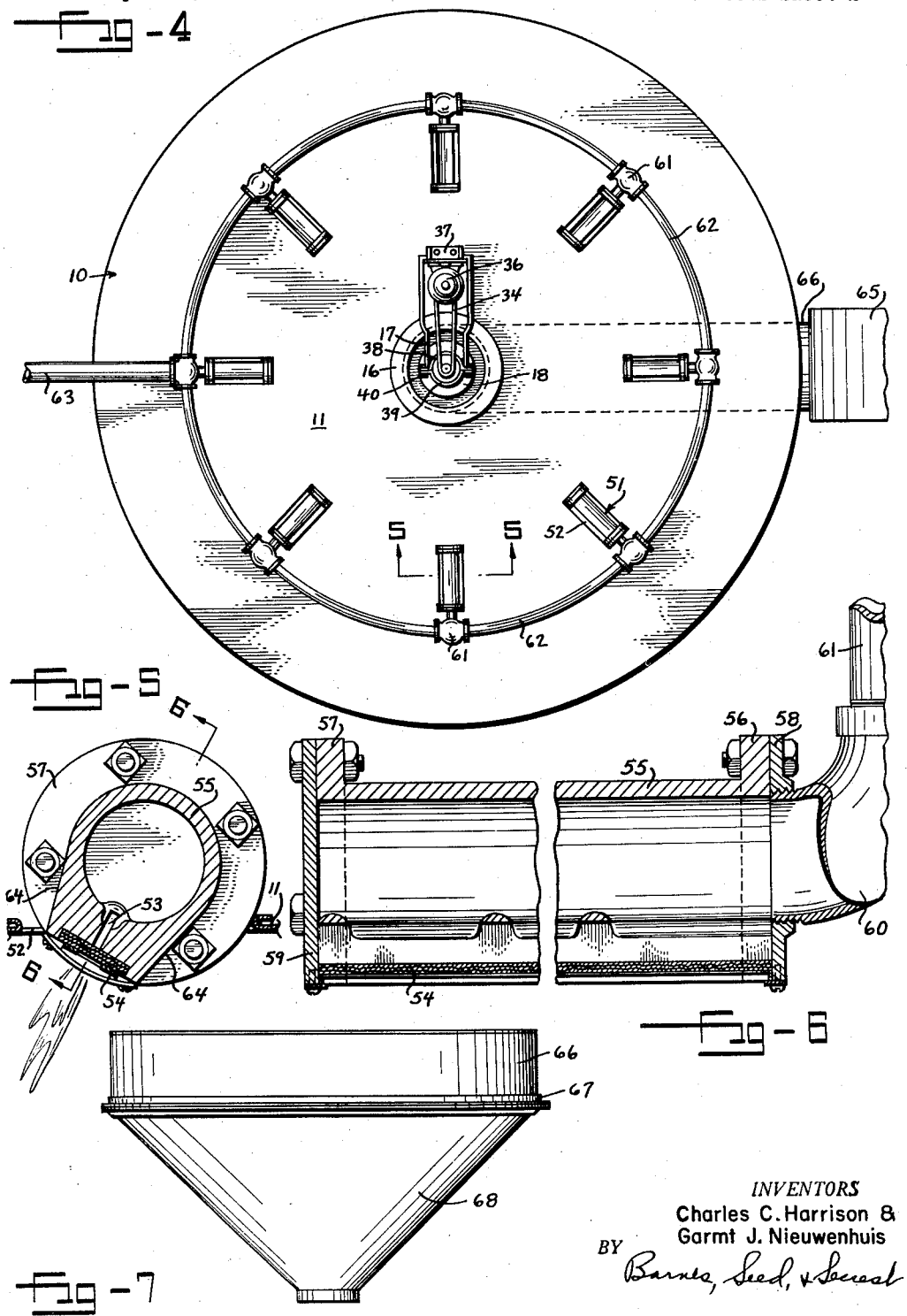

United States Patent Office 2,872,973
Patented Feb. 10, 1959

2,872,973

SPRAY DRYING APPARATUS FOR LIQUID MATERIAL

Garmt J. Nieuwenhuis and Charles C. Harrison, Seattle, Wash.

Application September 19, 1955, Serial No. 535,185

4 Claims. (Cl. 159—4)

The present invention relates to method and apparatus for drying liquid material, and has particular application in the drying of animal blood. Accordingly, the invention will be described with reference to the processing of blood, but no limitation in the use of the invention for this one liquid material is intended.

In the prior art a stream of heated air has been commonly employed as the sole means to dry animal blood sprayed into the stream. The resulting apparatus has not been particularly efficient and has been necessarily large in size and too costly for employment in relatively small slaughtering establishments. Therefore, the present invention aims to provide an improved drying method which utilizes extremely compact improved apparatus which is of economical construction and simple to operate. In carrying out this object we apply heat directly to the animal blood while it is sprayed as well as heating air passed through the spray, which air, as above-mentioned, has heretofore been relied upon as the sole heat source for the sprayed blood.

As a further object we aim to provide an improved spraying assembly in the drying apparatus.

With yet additional objects and advantages in view which, with the foregoing, will appear and be understood in the course of the following description and claims, the invention consists in the new method and in the apparatus for performing said method, and in the adaptation and combination of parts hereinafter described and claimed.

In the accompanying drawings:

Figure 1 is a side elevational view, partly in vertical section, of our improved drying apparatus.

Fig. 2 is a fragmentary longitudinal vertical sectional view through our improved spraying assembly taken as indicated by line 2—2 of Fig. 1.

Fig. 3 is a transverse fragmentary sectional view of the spray head taken as shown by line 3—3 in Fig. 2.

Fig. 4 is a top plan view of our apparatus.

Fig. 5 is a fragmentary transverse vertical sectional view through one of the burner units and taken as indicated by line 5—5 in Fig. 4.

Fig. 6 is a fragmentary longitudinal sectional view taken as indicated by line 6—6 in Fig. 5; and Fig. 7 is a side elevational view of a modified housing providing the drying chamber.

Referring to the drawings it is seen that a drying chamber is provided by a cylindrcal housng 10 fabrcated from sheet metal and havng top and bottom walls 11, 12. The housng may be externally insulated if desired and its side wall has an access door 13 and glass-covered peep hole 14. At its center the top wall 11 is formed with an opening through which is suspended a well-defining member 15 having an inverted frustro-conical shape and an upper support rim 16. Depending from yoke arms 17 into the resulting well is a spraying assembly which includes a disc-like spray head 18 located below the member 15.

This spray head 18 is wedged onto a tapered section 19 at the lower end of a shaft 20 by a nut 21. Ball bearing units 22, 23 provide a journal for the shaft 20 and the outer races of these units are fitted into counter-bores formed at the ends of a tubular member 24. The inner races of the units are held against respective of annular shoulders 25 by nuts 26 each having a locking complement 27. Defined between the bearing units is a lubricating chamber. Oil vapor for lubricating the bearings is supplied to this chamber through a tube 28 connecting by an elbow fitting 29 with the tubular member 24.

A cap 30 secured by screws 31 closes the upper end of the member 24 and has a center opening through which the shaft 20 projects upwardly to receive a pulley 32. This pulley is sleeved on a terminal neck and is held rigidly with respect to the shaft by a nut 33. A belt 34 transfers power to the pulley 32 from a drive pulley 35 located on the vertically arranged output shaft of an electric motor 36. The latter is secured to an angle bracket 37 which is mounted on the top wall 11. It is from this bracket that the yoke arms 17 extend, first horizontally, and then downwardly to connect with a semicylindrical clamp half 38, the other half 39 of the clamp being shorter and secured directly to the tubular member 24. Opposed perforated ears project laterally from the vertical side edges of these clamping complements 38, 39 to receive bolts 40 for drawing them together.

The spray head 18 has a cavity 41 open at the top except for an inturned peripheral flange 42. Depending into the cavity and closing the lower end of the tubular member 24 is a circular manifold member 43. This member has a downwardly faced annular groove 44 which is covered by a round plate 45. Several holes 46 in this plate connect the groove with the cavity and screws 47 hold the plate and manifold member 43 in position. It will be noted that the latter presents a rim flange 48 closely overlying the flange 42, but not in contact therewith.

Radiating horizontally from the cavity 41 are a plurality of evenly spaced discharge passages 49. These passages are purposely elongated and are not truly radial, but as shown in Fig. 3, make approximately a forty-five degree angle with respective radii through their inner ends.. The animal blood or other liquid material to be dried is pumped through a supply tube 50 leading into the annular groove 44. From thence it travels through the holes 46 into the cavity 41 of the rotating spray head wherein centrifugal force urges the blood radially outward into the discharge passages 49 from which it issues in spray form. The purpose of elongating the discharge passages 49 is to assure that the blood will gain the peripheral speed of the spray head before discharging therefrom. In this regard these passages 49 digress from a radius as afore-mentioned in the direction of rotation of the spray head so that the individual blood particles will have a resultant direction of travel as they move from the spray head which forms as small an acute angle as practical with a tangent passing through the outer end of the respective dischrge passage. In other words we desire the sprayed blood to leave the rotating spray head in as close to a tangential path as possible.

Spaced equidistantly from the spray assembly are a plurality of direct heat sources, shown for purposes of example as being elongated gas burner units 51. These units extend horizontally and depend into rectangular radial cutouts 52 formed in the top wall 11 and serving as inlets to the drying chamber. As best shown in Fig. 5, the burners are tilted about their longitudinal axes so that their jet passages 53 leading to diffuser screens 54 are about thirty degrees from a vertical plane through such axes. Accordingly, the flame fronts of the burners are tilted a corresponding amount from the vertical and the direction of tilt thereof should be in correspondence with the direction of rotation of the spray head. The hollow body section 55 of each burner unit has inner and outer end flanges 56, 57 to which are bolted caps 58, 59. Cap 58 threadably receives an elbow 60 which joins a vertical leg of a respective T-fitting 61. The arms of the latter are joined by arcuate manifold pipe sections 62 to form a circular manifold which may be supported from the overhead or by brackets mounted on the top wall 11. A pipe 63 supplies gas to the manifold and hence to the burners.

It should be noted from Fig. 5 that the body section 55 of each burner is spaced from the side edges of the respective cutout 52 so that the cutout can serve as an air inlet to the drying chamber as well as accommodating the burner. Also, it should be observed that the body section 55 has flat sides 64 making the body section a diverter tending to guide air entering the cutout in the same general direction as the flame front of the burner.

Air is caused to be fed from the atmosphere into the housing 10 through the inlets 52 by a blower 65 which draws air from the drying chamber via an outlet duct 66 joining the center of the bottom wall 12. As the air travels the length of the housing from the inlets to the outlet it travels a generally cycloidal or whirl path because of the tilted flame front and diverter effect of the burner units 51, the circular cross-section of the housing 10, and the central location of the outlet. The direction of rotation of this cycloidal path is the same as that of the spray head 18.

Reviewing the operation of our drying apparatus it should be kept in mind that the burners 51 have two particular heating functions, and namely to heat the air immediately upon its entry through the inlets 52 and to apply heat directly to the liquid material to be dried as it is sprayed in the general direction of the flame fronts of the burners by the spray head 18. The heated air aids in the drying of the material, absorbs the moisture yielded by the material, and serves to carry the dried material from the drying chamber. After passing out of the latter and through the blower 65 the dried material is centrifuged from its air carrier by a cyclone separator in the conventional manner. It should be kept in mind that the swirl of the centrifugalized liquid to be dried as it issues from the spray head will approximate directionally the swirl of the heated air in the drying chamber so that the sprayed liquid material will have substantially no tendency to disrupt the cycloidal travel path of this air as the air and material merge.

As an example of operation conditions for the drying of animal blood by our method and apparatus, dried blood which is 80% soluble and has a moisture content of 8 to 10% can be obtained when the air is drawn through the blower at 2,000 cu. ft./min., the liquid blood is sprayed at 80 gal./hr., and the outlet temperature is about 375° F. before spraying has commenced. Raising of this temperature causes a reduction in the solubility and moisture content of the dried blood. In all cases the liquid blood should be well filtered before being fed to the spray assembly.

The quantity of air required of course may be affected by atmospheric conditions if the air is drawn directly from the atmosphere into the drying chamber in that on a highly humid day a greater air flow would be required to absorb a given amount of moisture yielded by the liquid while drying than on a day of low humidity. Accordingly, it is anticipated that in some installations it may be desirable to pretreat the air or other gas used to hold its humidity at a constant intake value.

We have illustrated a modified housing **10*a* in Fig. 7 having a relatively short cylindrical head section 66 joined by ring flanges 67 with a conical foot section 68** tapering to an outlet. In such an arrangement the spray head operates in the head section.

In the embodiment illustrated in the drawings gas burners of a particular type have been disclosed as direct heat sources for purposes of example only since it is not our intention to limit the practice of our invention to such type or to sources which are gas fired.

The advantages of the invention, it is thought, will have been clearly understood from the foregoing detailed description. Minor changes will suggest themselves and may be resorted to without departing from the spirit of the invention, wherefore it is our intention that no limitations be implied and that the hereto annexed claims be given a scope fully commensurate with the broadest interpretation to which the employed language admits.

What we claim is:

1. In drying apparatus, a housing providing a circular drying chamber having a longitudinal center axis extending between an inlet end wall and an outlet, said end wall having a plurality of air inlet openings therethrough spaced radially from said axis, a blower having its suction side communicating with said chamber outlet for drawing air through said inlet openings and thence in a travel path through said chamber, air diverter means operatively associated with said end wall for imparting a whirl to said travel path, fuel introducing means located in said inlet openings and producing flame fronts firing directly into said chamber, centrifugal spray means mounted proximal said end wall for rotation about said axis and operative to spray the material to be dried into said air travel path proximal said flame fronts whereby moisture in the sprayed material is absorbed by said air and the dried material thereupon drawn from the chamber with the saturated air by said blower.

2. In drying apparatus, a houing providing a circular drying chamber having a longitudinal center axis extending between an inlet end wall and an outlet, said end wall having a plurality of air inlet openings therethrough equally spaced apart in a circular pattern centered at said axis, a blower having its suction side communicating with said chamber outlet for drawing air through said inlet openings and thence through said chamber, fuel introducing means in said inlet openings and producing flame fronts firing directly into said chamber with such flame fronts tilted in a common circumferential direction at an acute angle with respect to a plane transverse to said axis, said fuel introducing means thereby causing said air to travel through said chamber in a whirl path having its axis generally coinciding with said longitudinal axis, and centrifugal spray means mounted proximal said end wall for rotation about said longitudinal axis and operative to spray the material to be dried into said air whirl path proximal said flame fronts whereby moisture in the sprayed material is absorbed by said air and the dried material thereupon drawn from the chamber with the saturated air by said blower.

3. In drying apparatus, a housing providing a circular drying chamber having a longitudinal center axis extending between an inlet end wall and an outlet, said end wall having a plurality of air inlet openings therethrough spaced radially from said axis, a blower having its suction side communicating with said chamber outlet for drawing air through said inlet openings and thence in a travel path through said chamber, respective combination fuel introducing and air diverter means located in said inlet openings and producing flame fronts firing directly into said chamber, said means being so arranged and so tilted at an acute angle with a plane transverse to said axis as to cause said travel path of the air to whirl around said axis, and centrifugal spray means mounted proximal said end wall for rotation about said longitudinal axis and operative to spray the material to be dried into said air travel path proximal said flame fronts whereby moisture in the sprayed material is absorbed by said air and the dried material thereupon drawn from the chamber with the saturated air by said blower.

4. In drying apparatus, a housing providing a circular drying chamber having a longitudinal center axis extending between an inlet end wall and an outlet, said end wall having a plurality of elongated air inlet openings therethrough radiating from said axis in spaced relation thereto, a blower having its suction side communicating with said chamber outlet for drawing air through said inlet openings and thence through said chamber, respective elongated combination fuel introducing and air diverter means located in said inlet openings in spaced relation to most of the length of the longitudinal side edges thereof and producing flame fronts firing directly into said chamber, said means and flame fronts being so tilted in a common circumferential direction with respect to a plane transverse to said axis as to cause said air to have a whirling travel path through said chamber, and centrifugal spray means mounted proximal said end wall for rotation about said longitudinal axis and operative to spray the material to be dried into said air travel path adjacent said flame fronts whereby moisture in the sprayed material is absorbed by said air and the dried material thereupon drawn from the chamber with the saturated air by said blower.

References Cited in the file of this patent

UNITED STATES PATENTS

| | | |
|---|---|---|
| 1,313,779 | Bell | Aug. 19, 1919 |
| 1,471,765 | Wilson | Oct. 23, 1923 |
| 1,782,822 | Hechenbleikner | Nov. 25, 1930 |
| 1,853,682 | Hechenbleikner | Apr. 12, 1932 |
| 2,317,479 | Peebles | Apr. 27, 1943 |
| 2,602,002 | Schutt | July 1, 1952 |
| 2,644,516 | Brendel | July 7, 1953 |

FOREIGN PATENTS

| | | |
|---|---|---|
| 635,176 | Germany | Sept. 11, 1936 |
| 406,100 | Italy | Oct. 16, 1943 |